Figure 1:
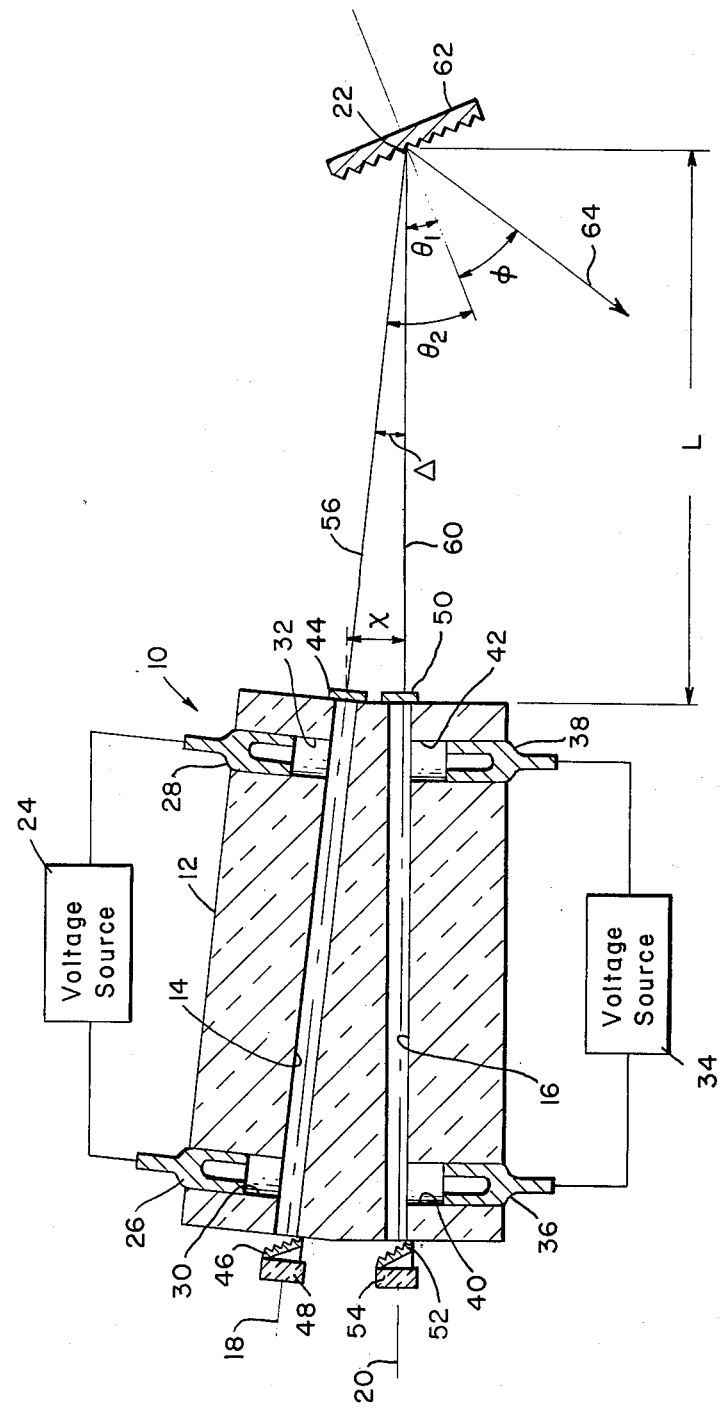

United States Patent [19]

Chester

[11] 3,970,963
[45] July 20, 1976

[54] WAVEGUIDE LASER ARRANGEMENT FOR GENERATING AND COMBINING A PLURALITY OF LASER BEAMS
[75] Inventor: Arthur N. Chester, Malibu, Calif.
[73] Assignee: Hughes Aircraft Company, Culver City, Calif.
[22] Filed: May 1, 1975
[21] Appl. No.: 573,715

[52] U.S. Cl. ............................ 331/94.5 C; 350/174
[51] Int. Cl.² ........................................ H01S 3/082
[58] Field of Search ............ 331/94.5; 350/169–174, 350/162; 356/93, 95

[56]       References Cited
          UNITED STATES PATENTS
3,472,594   10/1969   Hughes et al. .......................... 356/93
3,577,093   5/1971   Simpson ............................... 331/94.5

Primary Examiner—William L. Sikes
Attorney, Agent, or Firm—Paul M. Coble; W. H. MacAllister

[57] ABSTRACT

Laser arrangements are disclosed wherein a plurality of individual laser beams at slightly different wavelengths are generated in respective capillary bore waveguides in a common body of dielectric material. The generated laser beams are caused to converge upon a preselected intersection point, either by constructing the bore waveguides with converging longitudinal axes or by deflecting the generated laser beams into the desired converging paths by means of an optical prism. A diffraction grating is positioned at the laser beam intersection point to combine the respective laser beams emitted from the bore waveguides into a composite beam along a coincident path.

8 Claims, 2 Drawing Figures

WAVEGUIDE LASER ARRANGEMENT FOR GENERATING AND COMBINING A PLURALITY OF LASER BEAMS

This invention relates to lasers, and more particularly relates to an arrangement for combining the individual output beams from a plurality of waveguide lasers formed in a common body.

There are a number of laser system applications in which it is desired to combine the respective output beams from a plurality of lasers such that the beams travel to a distant location along a coincident path. For example, in a laser communication system a plurality of $CO_2$ lasers operating on different nearby wavelengths can be independently phase modulated. By combining the respective output beams from such lasers into a single transmitted beam, wide-band information can be multiplexed to a distant receiver.

Laser beams have been combined in the past by impinging a pair of orthogonally traveling beams on aligned points on opposite surfaces of a beamsplitter so that respective portions of the incident beams are transmitted and reflected coincidentally with one another. Portions of either or both of the resultant composite beams can be successively combined with additional laser beams by means of further beam splitters. However, since approximately half of the incident laser energy is lost at each beamsplitter, beam combinng arrangements of this type suffer from low efficiency.

Another approach to the problem of combining the respective output beams from a plurality of lasers involves impinging the respective laser beams on coincident points on a diffraction grating or prism with carefully selected angles of incidence. Not only must these angles of incidence be maintained to very high accuracy in order to insure coincidence of the composite beam, but in addition, when the individual laser wavelengths are near one another, as is usually the case, the angles of incidence for the respective beams are very close to one another. This requires that the separation between the beam-combining grating or prism and the various lasers be impractically large.

It is an object of the present invention to provide an arrangement for generating a plurality of laser beams and for combining the individual beams into a composite beam traveling along a coincident path, and which arrangement achieves minimum loss of laser energy in a compact design of minimum size, weight and number of components.

It is a further object of the invention to provide a simple and reliable arrangement for generating a plurality of individual laser beams at slightly different wavelengths and for combining these beams into a composite beam along a coincident path by means of a dispersive optical element, and in which the separation between the dispersive element and each laser beam source location is substantially smaller than heretofore has been achieved.

An arrangement according to the invention includes a body of dielectric material defining a plurality of capillary bores therethrough of a diameter suitable for guiding laser light. A laser gas is disposed in each of the bores, and a plurality of optical resonators are independently operatively associated with respective ones of the bores. Each optical resonator includes a partially transmissive reflector near the end of the associated bore closer to a common point. The laser gas in each of the bores is excited to a condition of stimulated emission so that a plurality of laser beams are emitted from the respective bores. A dispersive optical element positioned to intercept the laser beams emitted from the respective bores combines these laser beams into a composite beam along a coincident path.

In one embodiment of the invention the capillary bores are oriented relative to one another such that their respective longitudinal axes converge upon an intersection point on the dispersive optical element, while in another embodiment the laser beams from the respective bores are deflected into the desired paths which converge upon such an intersection point.

Figure 2:
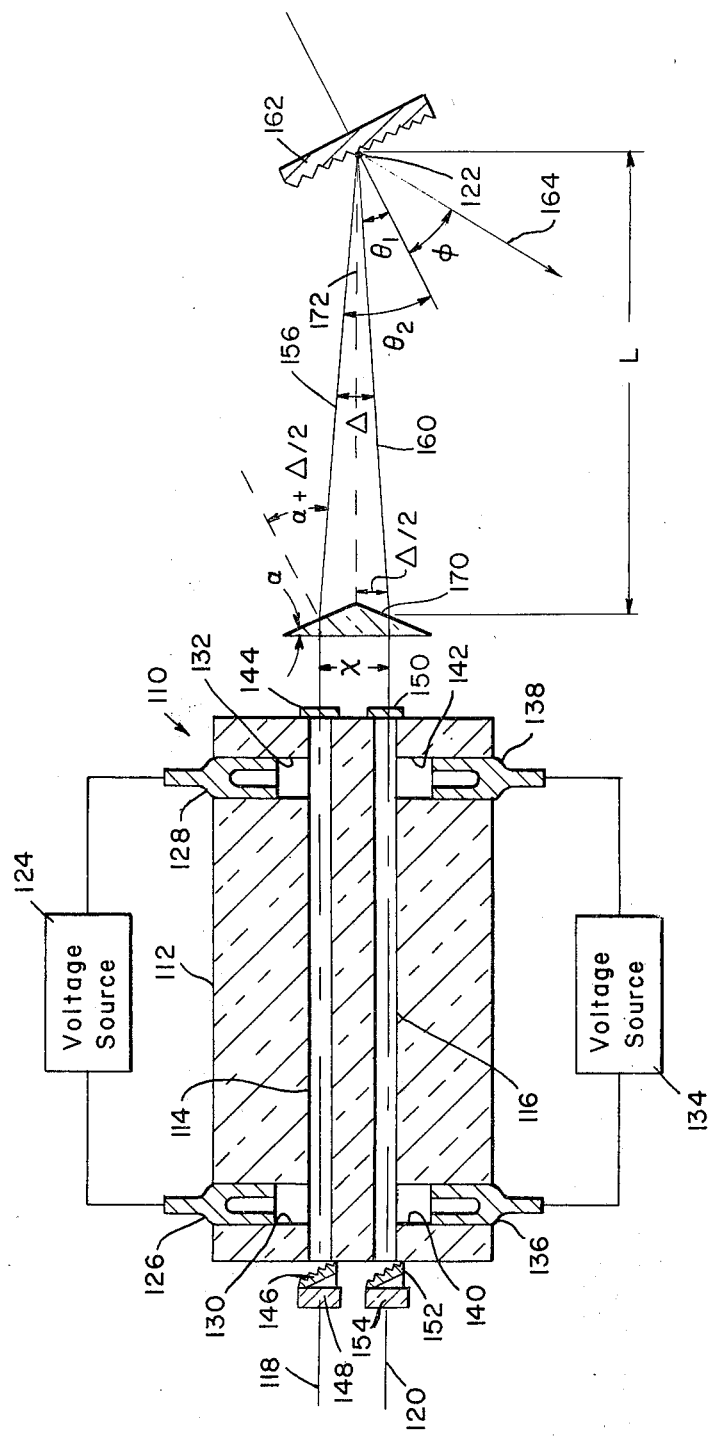

Additional objects, advantages and characteristic features of the invention will become apparent from the following detailed description of preferred embodiments of the invention when considered in conjunction with the accompanying drawings in which:

FIG. 1 is a partially schematic longitudinal sectional view illustrating a laser beam generating and combining arrangement in accordance with one embodiment of the invention; and FIG. 2 is a view similar to FIG. 1 showing an arrangement according to another embodiment of the invention.

Referring to FIG. 1 with greater particularity, an arrangement according to the invention may be seen to include a waveguide laser array 10 for generating a plurality of individual laser beams at slightly different wavelengths. The laser array 10 is formed in a single body, or block, 12 of dielectric material such as BeO. A plurality of capillary bores 14 and 16, one for each laser in the array, are formed through the block 12. It is pointed out that while two such bores are shown for purposes of illustration, any number may be employed as limited by practical space considerations. As will be discussed in more detail below, the respective longitudinal axes 18 and 20 of the bores 14 and 16 are oriented at a small angle $\Delta$ relative to one another such that they intersect at a point 22 located a distance L from the block 12 for a bore axis separation $x$ at the end of block 12 facing point 22. As a specific example for illustrative purposes, each of the capillary bores 14 and 16 may have a diameter of 1 mm and a length of 18 cm.

Each of the capillary bores 14 and 16 is filled with a desired laser gas which may be either the same laser gas or a different laser gas. Also, the bores 14 and 16 may be fed from either a common gas supply or separate gas supplies (not shown). As a specific example, the laser gas in the bores 14 and 16 may be a mixture of $CO_2$ and He, with the ratio of He to $CO_2$ ranging from about 3:1 to about 14:1. For such gas mixture ratios, the total gas pressure may range from about 50 Torr to about 300 Torr.

In order to excite the laser gas in each of the capillary bores 14 and 16 to a condition of stimulated emission, an electrical discharge is established in each of the bores 14 and 16. For this purpose, a voltage source 24 is connected between a pair of electrodes 26 and 28 secured within respective radial bores 30 and 32 in block 12 in gas flow communication with capillary bore 14 near the respective ends thereof. Similarly, a voltage source 34 is connected between electrodes 36 and 38 secured within respective radial bores 40 and 42 in block 12 in gas flow communication with capillary bore 16 near the respective ends thereof. It is pointed out that although separate voltage sources 24 and 34 are shown, a common power supply may be employed to excite the laser gas in each of the bores 14 and 16.

In order to provide an optical resonator for reflecting laser light back and forth through capillary bore 14, a partially reflecting mirror 44 may be mounted at the end of bore 14 closer to point 22, while a high-efficiency diffraction grating 46 may be mounted in a Littrow configuration at the opposite end of bore 14 to serve as a highly reflecting mirror for a selected laser transition. A piezoelectric transducer 48 may be attached to mirror 46 to adjust the position of mirror 46 along bore axis 18 and thereby achieve fine tuning to the desired laser transition. Similarly, capillary bore 16 may be provided with a partially reflecting mirror 50 at its end closer to point 22, with a high-efficiency diffraction grating 52 mounted on a piezoelectric transducer 54 at its opposite end. Also, means (not shown) may be provided for adjusting the angle and alignment of the diffraction gratings 48 and 54. The gratings 48 and 54 enable the optical resonators for the respective capillary bores 14 and 16 to be independently tuned to different wavelengths. As a specific example, for a $CO_2$ laser medium, one of the resonators such as 50–52 may be tuned to the P(18) transition at $\lambda_1 = 10.571037$ $\mu$m and the other resonator 44–46 tuned to the P(20) transition at $\lambda_2 = 10.591035$ $\mu$m.

As was mentioned above, capillary bores 14 and 16 are oriented relative to one another such that their respective longitudinal axes 18 and 20 intersect at point 22. A dispersive optical element, illustrated as a diffraction grating 62, is disposed at intersection point 22 to combine individual laser beams 56 and 60 generated along the respective bore axes 18 and 20 into a composite beam 64 traveling along a coincident path. It should be understood that while a diffraction grating is shown for illustrative purposes, a beam-combining prism could be employed instead. As a specific example in conjunction with the aforementioned $CO_2$ laser wavelengths $\lambda_1$ and $\lambda_2$, grating 62 may be an aluminum coated diffraction grating having 667 grooves per mm at a groove spacing $d = 15$ $\mu$m.

As is well known, a beam of radiation incident upon a diffraction grating at an angle $\theta$ with respect to the normal to the grating is diffracted by the grating into m beams in accordance with the relation $$d(\sin \theta + \sin \phi) = m\lambda \qquad (1)$$

where $\phi$ is the angle between the direction of diffraction and the normal to the grating, $m$ is an integer representing the order number of the diffracted beam, $\lambda$ is the wavelength of the radiation, and $d$ is the spacing between the grating grooves.

For the arrangement shown in FIG. 1 laser beam 60 of wavelength $\lambda_1$ is incident upon grating 62 at an angle $\theta_1$ with respect to the grating normal, laser beam 56 of wavelength $\lambda_2$ is incident upon grating 62 at an angle $\theta_2$ relative to the grating normal, and composite beam 64 leaves the grating 62 at an angle $\phi$ with respect to the grating normal. Thus, for the arrangement of FIG. 1

$$d(\sin \theta_1 + \sin \phi) = m\lambda_1 \qquad (2)$$

and $$d(\sin \theta_2 + \sin \phi) = m\lambda_2. \qquad (3)$$

The angle $\Delta = \theta_2 - \theta_1$ between the laser beams 56 and 60 is sufficiently small so that the distance L between the grating 62 and the end of laser block 12 may be determined from the relation $$x/L = \theta_2 - \theta_1 \qquad (4)$$

where $x$ is the separation between the bore axes 18 and 20 at the end of block 12 facing diffraction grating 62, and $\theta_2 - \theta_1$ is measured in radians.

A specific illustrative example will now be given for constructing an arrangement according to FIG. 1 using the aforementioned $CO_2$ laser wavelengths $\lambda_1 = 10.571037$ $\mu$m and $\lambda_2 = 10.591035$ $\mu$m. For a diffraction grating having a groove spacing $d = 15$ $\mu$m and a first order ($m = 1$) diffracted beam 64 leaving the grating 62 at an angle $\phi = 0°$, Equations (2) and (3) may be employed to calculate the angles of incidence on the grating 62 for the respective beams 60 and 56 as $\theta_1 = 44.80820°$ and $\theta_2 = 44.91597°$. The difference between these angles of incidence $\Delta = \theta_2 - \theta_1 = 0.10777° = 1.8809 \times 10^{-3}$ radians. The minimum distance $x$ between bore axes 18 and 20 which may be employed in the arrangement of FIG. 1 is approximately equal to the bore diameter (assuming the bores 14 and 16 have the same diameter). Thus, for a bore diameter of 1 mm, Equation (4) gives a diffraction grating-laser separation $L = 53.2$ cm. In practice, however, it is preferred to make the bore axis separation $x$ a few times greater than the bore diameter. Thus, for $x = 3$ mm, $L = 159.6$ cm.

If output laser beams at 10.571037 $\mu$m and 10.591035 $\mu$m from a pair of conventional lasers were combined using a diffraction grating, i.e., without an arrangement according to the invention, the minimum distance between the diffraction grating and the various lasers would be more than an order of magnitude greater (over 26 meters for laser tube diameters of 5 cm) than when the present invention is employed. In addition, with an arrangement according to FIG. 1, the proper relative orientation of the various laser beams is maintained by the fixed bore geometry in the block 12, and no additional equipment is required for this purpose. Moreover, since the various lasers of the present invention are all formed within a common body, an extremely compact design of minimum size, weight and number of components is achieved.

A further embodiment of the invention is illustrated in FIG. 2. Components in the embodiment of FIG. 2 which correspond to respective components in the embodiment of FIG. 1 are designated by the same second and third reference numeral digits as their counterpart components in FIG. 1, along with a prefix numeral 1.

The embodiment of FIG. 2 differs from that of FIG. 1 in that capillary bores 114 and 116 through block 112 are disposed parallel to one another, and an optical prism 170 is disposed between laser block 112 and diffraction grating 162 to deflect the respective laser output beams 156 and 160 from the bores 114 and 116 such that beams 156 and 160 converge upon intersection point 122 on the diffraction grating 162. The prism 170, which may be of CdTe for example, is preferably an isosceles triangular prism oriented so that its base lies perpendicular to the longitudinal axes 118 and 120 of the bores 114 and 116 and such that a line 172 from its vertex to intersection point 122 bisects the angle $\Delta$ between converging beams 156 and 160. Each lateral rectangular prism face makes an angle $\alpha$ with the base of the prism.

The prism angle $\alpha$ required to deflect the laser beams 156 and 160 from the respective bores 114 and 116 into the desired converging paths as shown in FIG. 2 may be determined from the well known prism equation $$\eta = \frac{\sin(\alpha + \Delta/2)}{\sin \alpha} \approx 1 + \frac{\Delta}{2\alpha} \qquad (5)$$

where $\eta$ is the index of refraction of the prism material. Solving Equation (5) for the prism angle $\alpha$ gives $$\alpha = \frac{\Delta}{2(\eta-1)} \qquad (6)$$

For a prism of CdTe ($\eta = 2.67$) and for a laser beam angle of incidence difference $\Delta = 1.8809 \times 10^{-3}$ radians as determined above, Equation (6) yields a prism angle $\alpha = 5.63 \times 10^{-4}$ radians.

It is further pointed out that by utilizing additional appropriately positioned prisms or prism faces, more than two laser beams can be combined in a manner similar to that described above with respect to the beams 156 and 160.

Although the present invention has been shown and described with reference to particular embodiments, nevertheless various changes and modifications which are obvious to a person skilled in the art to which the invention pertains are deemed to lie within the spirit, scope and contemplation of the invention.

What is claimed is:

1. A waveguide laser arrangement for generating and combining a plurality of laser beams comprising:
   means for generating a plurality of laser beams of differing wavelengths and for emitting said beams along respective paths converging upon an intersection point, said means including a body of dielectric material defining a plurality of capillary bores therethrough of a diameter suitable for guiding laser light, a laser gas disposed in each of said bores, a plurality of optical resonators independently operatively associated with respective ones of said bores and tuned to different wavelengths, each resonator including a partially transmissive reflector near the end of the associated bore closer to said intersection point, and means for exciting the laser gas in each of said bores to a condition of stimulated emission; and
   dispersive optical means positioned at said intersection point for combining the laser beams emitted along said respective paths into a composite beam along a coincident path.

2. A waveguide laser arrangement according to claim 1 wherein said dispersive optical means is a diffraction grating.

3. A waveguide laser arrangement for generating and combining a plurality of laser beams comprising:
   a body of dielectric material defining a plurality of capillary bores therethrough of a diameter suitable for guiding laser light, the respective longitudinal axes of said bores being oriented relative to one another such that they intersect at a point located a predetermined distance from said body;
   a laser gas disposed in each of said bores;
   a plurality of optical resonators independently operatively associated with respective ones of said bores and turned to different wavelengths, each resonator including a partially transmissive reflector near the end of the associated bore closer to said intersection point;
   means for exciting the laser gas in each of said bores to a condition of stimulated emission, whereby a plurality of laser beams of differing wavelengths are emitted from the respective bores along respective paths converging upon said intersection point; and
   dispersive optical means positioned at said intersection point for combining the respective laser beams emitted from said bores into a composite beam along a coincident path.

4. A waveguide laser arrangement according to claim 3 wherein said dispersive optical means is a diffraction grating.

5. A waveguide laser arrangement for generating and combining a plurality of laser beams comprising:
   a body of dielectric material defining a plurality of capillary bores therethrough of a diameter suitable for guiding laser light, the respective longitudinal axes of said bores being oriented relative to one another such that they intersect a region spaced from said body;
   a laser gas disposed in each of said bores;
   a plurality of optical resonators independently operatively associated with respective ones of said bores and tuned to different wavelengths, each resonator including a partially transmissive reflector near the end of the associated bore closer to said region;
   means for exciting the laser gas in each of said bores to a condition of stimulated emission, whereby a plurality of laser beams of differing wavelengths are emitted from the respective bores along respective paths intersecting said region;
   beam deflecting means disposed at said region and in the paths of the respective laser beams emitted from said bores for deflecting said laser beams into a plurality of paths converging upon an intersection point; and
   dispersive optical means positioned at said intersection point for combining the respective laser beams emitted from said bores into a composite beam along a coincident path.

6. A waveguide laser arrangement according to claim 5 wherein the respective longitudinal axes of said bores are oriented parallel to one another.

7. A waveguide laser arrangement according to claim 5 wherein said beam deflecting means is an optical prism.

8. A waveguide laser arrangement according to claim 5 wherein said dispersive optical means is a diffraction grating.

* * * * *